UNITED STATES PATENT OFFICE.

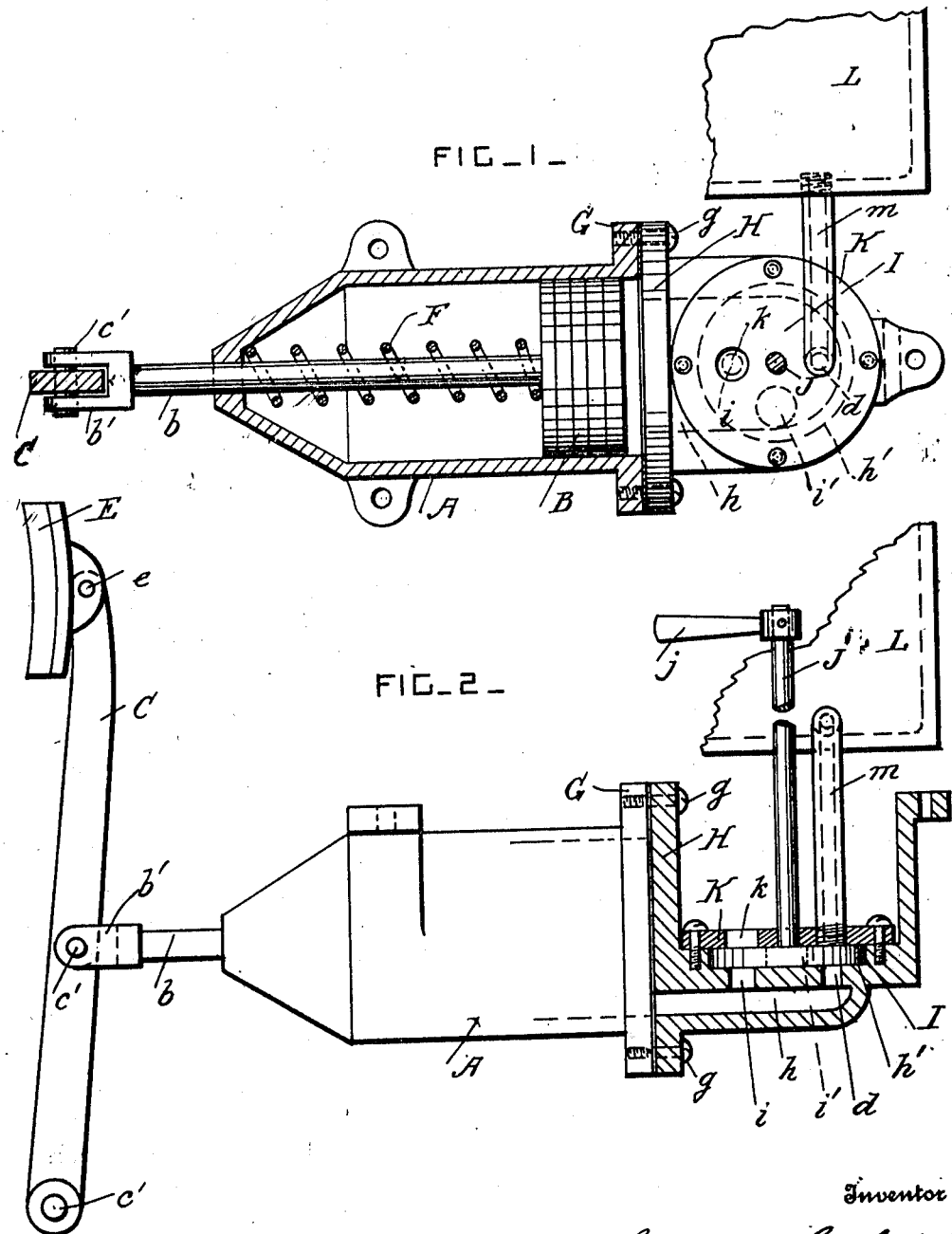

GEORGE O. GALBRAITH, OF RICHMOND, CALIFORNIA.

AIR-BRAKE.

988,998.

Specification of Letters Patent. Patented Apr. 11, 1911.

Application filed September 27, 1910. Serial No. 584,086.

*To all whom it may concern:*

Be it known that I, GEORGE O. GALBRAITH, a citizen of the United States, residing at Richmond, in the county of Contra Costa and State of California, have invented certain new and useful Improvements in Air-Brakes; and I do hereby declare the following to be a full, clear, and exact description of the invention, such as will enable others skilled in the art to which it appertains to make and use the same.

This invention relates to air brakes specially intended for use on automobiles; and it consists in the novel construction and combination of the parts hereinafter fully described and claimed.

In the drawings, Figure 1 is a plan view of the brake, showing the air cylinder in section. Fig. 2 is a side view, showing the air valve in section.

A is the brake cylinder which is arranged horizontally and secured to the frame of the automobile in any approved manner.

B is the air piston and $b$ is the piston-rod having a double-eye $b'$ on its projecting end.

C is a lever pivoted to the frame of the automobile by a pin $c$ in any approved way. One end of the lever C is pivoted to the double-eye $b'$ by a pin $c'$, and its other end is pivotally connected with a brake-shoe E by a pin $e$.

The brake-shoe may be connected with the lever by any approved intermediate connecting devices to enable the brake cylinder to be secured in the most convenient position, and to enable the brake-shoe to bear against one of the road wheels, and the brake may be constructed to operate on two road wheels each brake-shoe being operatively connected with the lever C in any approved manner.

F is a spring arranged inside the cylinder and normally holding the brake-shoe clear of the road wheel.

G is a flange at the other end of the cylinder from the spring, and H is a cover plate secured to the flange G by bolts $g$. The plate H has a horizontally projecting chamber $h$ which communicates with the interior of the cylinder, and which has a circular recess $h'$ at its top, and ports $i$ and $d$ which extend through its top.

I is a disk valve journaled in the recess $h'$ and provided with a vertical operating spindle J, which is arranged at a right-angle to the axis of the cylinder. The spindle is provided with any suitable handle $j$ on its upper end, and this handle is arranged in suitable and convenient proximity to the controlling handles and levers of the automobile. The handle may be secured directly to the spindle, or the spindle may be formed in sections connected together by any suitable universal joint or coupling.

K is a cover plate secured to the chamber $h$ over the disk valve. This cover plate is provided with an exhaust port $k$, and the valve is provided with a hole $i'$ for placing the port $i$ in communication with the port $k$.

L is a reservoir for compressed air secured to the frame of the automobile in any convenient position; and $m$ is a pipe which connects the reservoir L with the cover plate K of the valve. The hole in the valve is arranged so that it can place the pipe $m$ in communication with the port $d$ when the valve is closing the connection of the port $i$ with the exhaust port. The reservoir L is supplied with compressed air by any approved form of pump.

The brake is applied by the compressed air when the valve is moved in one direction, and is released by the spring when the valve is moved in the reverse direction.

What I claim is:

1. In an air brake, the combination, with a brake cylinder provided with a piston and a piston-rod, and brake mechanism operatively connected with the said rod; of a cover plate closing one end of the cylinder and provided with a projecting chamber, said chamber having a circular recess in its top and ports extending through its top, a disk valve provided with an operating spindle arranged at a right-angle to the axis of the cylinder, said valve being arranged in the said recess and provided with a hole, a reservoir for compressed air, a cover plate provided with an exhaust port and secured to the said chamber over the valve, and an air-supply pipe connecting the reservoir with the last said cover plate, said valve being oscillated to connect the aforesaid ports with the supply pipe and with the exhaust port alternately.

2. In an air brake, the combination, with a brake cylinder provided with a piston and a piston-rod, and brake mechanism operatively connected with the said rod; of a spring arranged in one end of the cylinder and operating to release the brake automatically, a cover plate closing the other end of the cylinder and provided with a projecting chamber, said chamber having a circular recess in its top and ports extending through its top, a disk valve provided with an operating spindle arranged at a right-angle to the axis of the cylinder, said valve being arranged in the said recess and provided with a hole, a reservoir for compressed air, a cover plate provided with an exhaust port and secured to the said chamber over the valve, and an air-supply pipe connecting the reservoir with the last said cover plate, said valve being oscillated to connect the aforesaid ports with the supply pipe and with the exhaust port alternately.

In testimony whereof I have affixed my signature in the presence of two witnesses.

GEORGE O. GALBRAITH.

Witnesses:
A. G. JACKSON,
F. CUSHING.